United States Patent [19]

Mandy

[11] Patent Number: 5,003,432
[45] Date of Patent: * Mar. 26, 1991

[54] DOWN LIGHTING SYSTEMS AND FIXTURES THEREFOR

[76] Inventor: Robert R. Mandy, 32750 Bingham La., Birmingham, Mich. 48010

[*] Notice: The portion of the term of this patent subsequent to Dec. 26, 2006 has been disclaimed.

[21] Appl. No.: 448,222

[22] Filed: Dec. 11, 1989

Related U.S. Application Data

[63] Continuation of Ser. No. 191,423, May 8, 1988, Pat. No. 4,890,200.

[51] Int. Cl.⁵ .............................................. F21V 19/04
[52] U.S. Cl. ...................................... 362/20; 362/183; 362/251; 315/86; 307/66
[58] Field of Search ................ 362/20, 145, 147, 148, 362/150, 249, 251, 254, 263, 276, 295, 802, 364, 365, 366, 183; 315/86, 87, 88; 307/66

[56] References Cited

U.S. PATENT DOCUMENTS

| | | | |
|---|---|---|---|
| 2,835,791 | 5/1958 | Horwitz | 362/366 |
| 3,336,473 | 8/1967 | Buzan | 362/20 |
| 4,071,749 | 11/1978 | Balogh | 362/20 |
| 4,156,891 | 5/1979 | Rochel | 362/20 |
| 4,218,725 | 8/1980 | Heffner et al. | 362/183 |
| 4,223,232 | 9/1980 | Bulat | 362/20 |
| 4,271,621 | 6/1981 | Garcia et al. | 362/183 |
| 4,504,894 | 3/1985 | Reibling | 362/296 |
| 4,520,436 | 5/1985 | McNair et al. | 362/147 |
| 4,682,078 | 7/1987 | Pascalide | 362/20 |
| 4,727,291 | 2/1988 | Bavaro | 362/20 |
| 4,749,908 | 6/1988 | Stiffer | 362/183 |
| 4,890,200 | 12/1989 | Mandy | 362/20 |

Primary Examiner—Stephen F. Husar
Assistant Examiner—D. M. Cox
Attorney, Agent, or Firm—John C. Evans

[57] ABSTRACT

A down lighting system for elevator cabs and the like includes halogen lights in standard and emergency light fixtures. Both types of fixtures are connected to the ceiling by a clamp arrangement which is universally adaptable to a wide variety of ceiling types without changing the light housing dimensions. The clamp arrangement fastens light housings against rotation with respect to the ceiling and it is adjustable to different height ceiling configurations merely by connection to different vertical positions of the outer surface of the fixture. The standard fixture includes a halogen bulb with its own reflector. The emergency lighting fixture includes a halogen bulb/reflector unit with the emergency self focusing bulbs concentrically spaced around it. Both light sources pass focused light directly into the space below the ceiling for meeting test point candle power requirements. The emergency lighting circuit includes a switching relay with a manually operated button for testing the emergency light source by pulling the button to override a relay armature.

3 Claims, 2 Drawing Sheets

DOWN LIGHTING SYSTEMS AND FIXTURES THEREFOR

This is a continuation of application Ser. No. 191,423, filed on May 8, 1988, now U.S. Pat. No. 4,890,200.

BACKGROUND OF THE INVENTION

This invention relates to lighting systems and more particularly to down lighting systems including down lighting emergency lights for elevator cabs and other spaces requiring high efficiency main lighting as well as integrated emergency lighting operative on failure of a main lighting power supply.

Lighting systems for various overhead ceiling systems require that light units be connected to a power supply through various wiring networks and connection arrangements.

It is known to provide standard 110 volt residential or commercial fixtures in overhead ceilings. In some cases the bulbs are 12 volt bulbs energized from a 110 volt system via individual step down transformers connected to power the 12 volt bulbs.

It is also known to provide a plurality of 110 volt bulbs connected to a 110 volt wiring system. The bulbs are mounted either above a egg-crate type grill covering or are hidden by a cover which will diffuse light from the bulbs. In some cases these systems are lighted by means of fluorescent tube lighting.

In cases where 12 volt bulbs are used, a large numbers of fixtures and bulbs are needed to provide enough candle power to illuminate the space below the ceiling system.

Existing down lighting systems use low light output bulbs which have short life or are operated at lower than design voltage to extend the bulb life, but all of which requires a large number of fixtures and elaborate wiring systems for connecting the fixtures to a power source.

In the case of elevator down lighting systems, it is desirable to provide as much direct lighting as possible from the main illuminating lamps both to reduce the number of fixtures required for a given area of ceiling and to reduce the complexity of the wiring system for supplying power to the individual fixtures.

A further problem with known elevator down light systems is that the emergency light source for the elevator is either located in the vicinity of the elevator control panel or is located at an overhead location above the ceiling. Such arrangements require a separate fixture for the emergency lighting. Also, in some cases the emergency light is hidden and it may be necessary to "bend" the light to produce a desired "test point" illumination within the elevator cab. Such emergency lights require more wattage which, in turn, require a larger, more expensive battery and attendant charger.

Another known emergency light system uses two of the down lights normally used for cab illumination. This system is expensive because it requires a large battery pack and charger for each light. Further, one or both bulbs may be burned out when called upon for the emergency mode.

SUMMARY OF THE INVENTION

Accordingly, an object of my invention is to provide a one piece, low profile, down lighting fixture which will provide direct focused lighting within the space below an overhead ceiling and wherein the lamp fixture is readily mounted to the ceiling by a wiring system which readily fits within low clearance plenums.

Another object of my invention is to provide such a down lighting lamp fixture and a fastener system which universally adapts the fixture housing for mounting on a variety of different height and clearance ceiling configurations.

A feature of the present invention is to provide such a lamp fixture wherein the housing includes a flanged open end and a closed end. The flanged open end is adapted to cover a fixture access hole through the ceiling and it has a diameter in excess of that of said housing to permit insertion of the housing through the access hole while defining a retention surface engageable with the outer surface of the ceiling so as to provide a locking engagement between the housing at the outer surface of the ceiling.

Another feature is to provide a fixture of the type set forth in the preceding paragraph and to further provide a retainer member extending vertically from the inner surface of the ceiling immediately adjacent the ceiling access hole and in close spaced parallelism with the outer surface of the housing. A retainer clamp surrounds the outer surface of the housing when it is inserted through the access opening and including means operative to force the retainer member into locking engagement with the outer surface of the housing while directing a hoop force on the housing which is radially opposed to the force of the retainer member and wherein the hoop retention force can be imposed on the housing anywhere along its height to accommodate for different thickness ceilings.

Still another feature is to reduce the "wired" profile of such fixtures by including a low profile conduit fitting that connects wires from a flexible conduit to socket means located inboard of the housing fixture.

Another object of my invention is to provide a ceiling mount fixture for mounting an illuminating bulb on different thickness ceilings and for connection to a flexible conduit type wire system by means of a fixture housing which is universally adaptable to different thicknesses of ceiling by use of a housing including an open end and a closed end. The open end has a diameter in excess of that of the housing to permit insertion of the housing through the access hole while defining a retention surface engageable with the outer surface of the ceiling when the fixture is mounted on the ceiling and a vertically oriented surface adaptable to be engaged by hoop type connectors immediately inboard of the inner surface of the ceiling so as to allow mounting of the fixture in low clearance plenums.

Yet another object of my invention is to provide a fixture for mounting on a ceiling in which first socket means are connected inboard of the housing for receiving a main source of illumination for directing regular illumination to a space below said ceiling; and wherein second socket means are connected inboard of the housing and concentric with the first socket means and adapted to be connected to an emergency power source for directing emergency lighting from the open end of said housing so as to provide an emergency source of illumination in the space below said ceiling upon primary or main power failure.

Another feature of my invention is to provide the fixture of the preceding object wherein the first socket includes a halogen bulb, a light reflector surrounding said bulb to direct the light from said halogen bulb vertically downwardly through said housing and a safety glass cover to diffuse light from the halogen bulb while serving to prevent shards from a broken halogen bulb from escaping through the open end of the fixture.

Yet another feature of my invention is to provide such a halogen bulb mounted in the center of the fixture and to provide secondary sockets located concentrically around the halogen bulbs to receive dedicated self focusing bulbs selectively connected to an emergency power pack for directing light downwardly through space in the housing for lighting the space below the ceiling light fixture upon a main power supply failure.

Another feature of the invention is to provide a housing of the type set forth above wherein the light source is in the form of a single ended fluorescent bulb having a free end located closely adjacent the open end of the fixture to provide down lighting therefrom and an opposite end carried by a base connected to a socket on the closed end of the fixture.

In one embodiment, a light system provides emergency lighting and regular illumination. One of the regular lights and the emergency lights share a common fixture with said housing including an open end and a closed end. The open end has a diameter in excess of that of said housing to permit insertion of the housing through the access hole while defining a retention surface engageable with the outer surface of the ceiling when the fixture is mounted on the ceiling.

First socket means are connected inboard of the housing for providing a first primary source of illumination for directing regular illumination to a space below said ceiling.

Second socket means are connected inboard of the housing and concentric with said first socket means and are adapted to be connected to an emergency power source for directing emergency lighting from the open end of said housing so as to provide an emergency source of illumination in the space below said ceiling during periods when the primary light is inoperative because of power failure. While such secondary socket means are shown as concentric, other offset locations are contemplated within the scope of my invention.

The one embodiment includes emergency lighting circuit means for connecting the second socket means to a source of emergency power when the power supply for the first primary source of illumination fails.

The emergency lighting circuit means includes a battery defining a rechargeable d.c. power source for emergency power, a battery charger having input terminals connected to the primary power source and outlet terminals for supplying charging current to the battery.

A double pole, double throw relay has a first pair of contacts and a second pair of contacts. A solenoid controlled armature is operatively connected to the first and second pairs of contacts. It is energized by the primary power source and positions the first pair of contacts to supply charging current to said battery as long as the primary power source is on. When the primary source of power fails, the solenoid positions the second pair of contacts to connect the battery to the second socket means so as to energize lamp means therein to provide emergency lighting.

A manually operative test button on the armature provides the means for manually disconnecting the first pair of contacts and connecting the second pair of contacts to connect the emergency lamp means to the battery to test emergency lighting when the primary power source is operative.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 6 is a sectional view of an emergency bulb and socket assembly taken along the line 6—6 of FIG. 5;

FIG. 7 is another embodiment of the light fixture of the present invention;

FIG. 8A is a diagrammatic view of a relay coil.

DETAILED DESCRIPTION OF THE PREFERRED EMBODIMENTS

Figure 1:
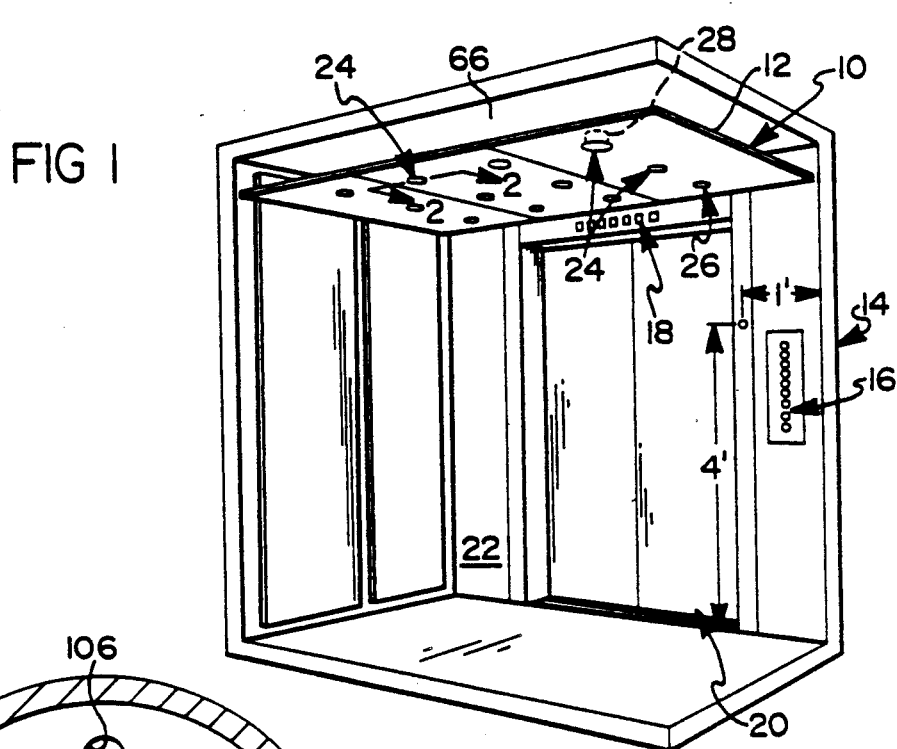
FIG. 1 is a perspective view showing an elevator cab including an overhead lighting system in accordance with the present invention.

Referring now to FIG. 1, the down lighting system 10 of the present invention is shown in association with a ceiling 12 in an elevator cab 14 which has two walls thereof broken away for clarity.

The elevator cab 14 has a control panel 16 and floor indicator lights 18 of a known kind, as well as a pair of sliding doors 20. The interior space 22 of the elevator cab 14 is illuminated by a plurality of main (sometimes called a primary source of illumination) light fixtures 24 one of which 26 provides main and emergency lighting (sometimes called a secondary source of illumination).

Figure 2:
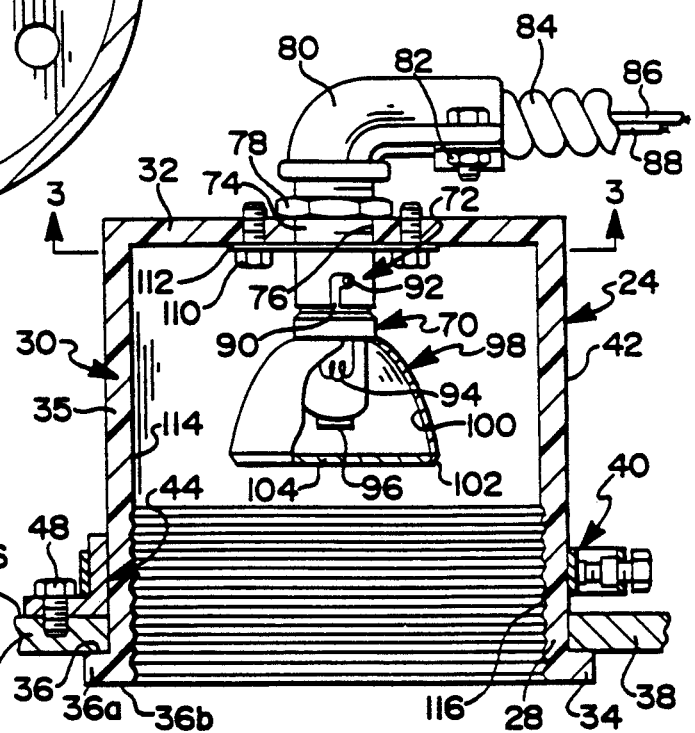
FIG. 2 is an enlarged sectional view taken along the line 2—2 of FIG. 1 looking in the direction of the arrows.

As shown in FIG. 2, each of the main light fixtures 24 (and 26) are supported on the ceiling 12 at access holes 28 therein.

More particularly, each of the main light fixtures 24 (and 26) includes a housing 30 having a closed end 32 and a flanged open end 34 joined respectively to an intermediate tubular portion 35.

The flanged open end 34 has an outer diameter 36a which overlies the access hole 28 and which further defines a retention surface 36 that engages the outer surface 38 of the ceiling 12 to lock the housing 30 against further inboard movement with respect to the ceiling 12.

Figure 4:
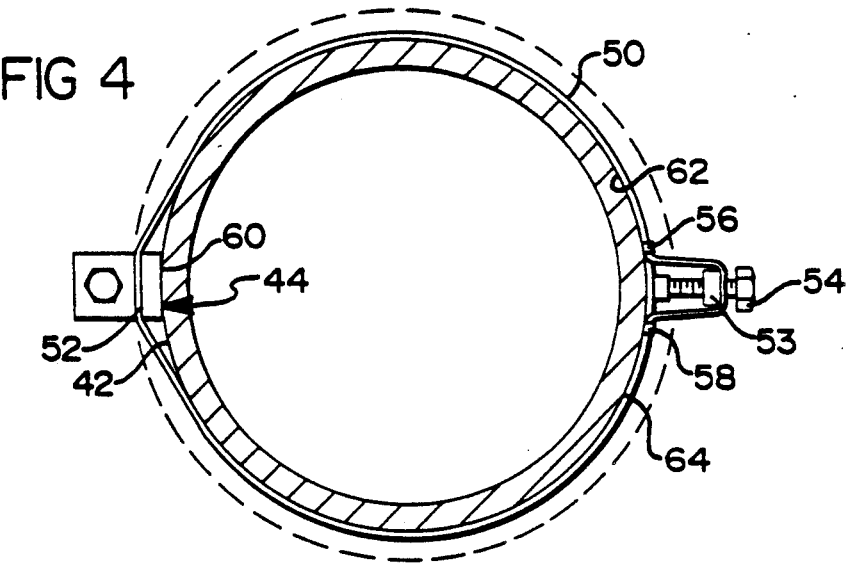
FIG. 4 is a fragmentary sectional view taken along the line 4—4 of FIG. 2 looking in the direction of the arrows.

In accordance with certain principles of my invention, the housing 30 is held in place on the ceiling 12 by a retainer assembly 40 of a form that can be adjustably positioned along its vertical surface 42 so as to enable the housing 30 to be universally adapted for mounting on a number of different ceiling thickness as will be discussed. The retainer assembly 40 more particularly includes a single L shaped retainer 44 with a lower leg that is connected to the inner surface 46 of ceiling 12 by a single fastener 48, representatively shown as a screw element. The upper leg of the L shaped retainer 44 is in close proximity to the access hole 28 and extends vertically upwardly of the surface 42. Consequently, it is positioned to engage a diametric point 52 on the outer surface 42 of the housing 30 as shown in FIG. 4.

The retainer assembly 40 also includes an annular clamp 50 which wraps around the full circumference of the outer surface 42 and against the outboard surface 52 of the upper leg of the L shaped retainer 44. It includes a tensioning nut 53 which positioned to be drawn outwardly by a screw element 54 so as to draw end segments 56, 58 of the annular clamp together. As the clamp is tightened, the inboard surface 60 of the upper leg 44 is forced against the outer surface 42. Simultaneously, the clamp 50 applies hoop pressure between the inner surface 62 of the annular clamp 50 and the diametrically opposite surface segment 64 of the outer surface 42 of the housing 30 as shown in FIG. 4. Retainer assembly 40 is thereby readily adjustable along different points on the height of the outer surface 42 of the housing 30 so as to be adjustable to different height or thickness ceilings 12. Consequently, the housing 30 is a universal housing suitable for a wide range of different ceiling applications. Furthermore, the arrangement enables such a universal housing configuration to be firmly clamped between the retention surface 36 and the retainer assembly 40 so that the assembled main light fixture 24 will not rotate with respect to the ceiling 12 during bulb replacement and following connection of a wiring system thereto such that the finally assembled fixture and bulbs mounted thereon will withstand dynamic test conditions for elevator operation without damage or dislodgement from the ceiling 12.

The arrangement enables individual fixtures to be quickly assembled and placed on the ceiling 12. Furthermore, the retainer assembly 40 is of low cost while providing a desired structural integrity between the main light fixture 24 and the ceiling 12.

A further feature of the main lamp fixture 24 is that it can be located in low clearance plenum spaces such as illustrated by reference numeral 66 in FIG. 1. More particularly, the housing 30 is configured so that only a reduced plenum height clearance is required to accommodate a high efficiency lamp source such as the halogen lamp assembly 70 of fixture 24. The halogen lamp assembly 70 is shown mounted in a socket 72 connected to the closed end 32 of the main light fixture 24.

More particularly, the conduit fitting 80 has a threaded end 74 thereon which is threadably received in an internally threaded bore 76 through the closed end 32. The threaded end 74 is locked to the outer surface of the closed end by a lock nut 78. The conduit fitting 80 has the opposite end thererof secured by a clamp assembly 82 to one end of a flexible conduit 84. The conduit 84 has wires 86, 88 directed therethrough to supply 12 volt power to the power contacts on the socket 72. Thus, the flexible conduit 84 is connected to the lamp housing 30 so that wiring thereto will not be separated or dislodged during elevator operation or replacement of bulbs in the fixture 24. In areas where electrical code does not require wire protection, the conduit 84 and conduit fitting 80 may be deleted. Further, the socket 72 may be mounted as shown in FIG. 2 or mounted on the top surface of closed end 32.

The socket 72 has a double contact bayonet connector into which the base 90 of the halogen lamp assembly 70 can be inserted and rotated to locate the retention pins 92 thereof in place and complete the electrical contact of the filament 94 of a halogen bulb 96 to the wires 86, 88. The halogen lamp assembly 70 further includes a reflector 98 that will focus the light from the filament 94 in a downward direction through the open end of the housing 30. The reflector 98 includes a bright inner surface 100 and has a spun over end 102 that captures a protective lens 104 which is secured on the end of the reflector 98 to keep the inner surface 100 clean. The lens 104 also prevents broken bulb fragments from falling into the elevator to meet protection requirements for down lighting systems of the type used in elevators.

Figure 3:
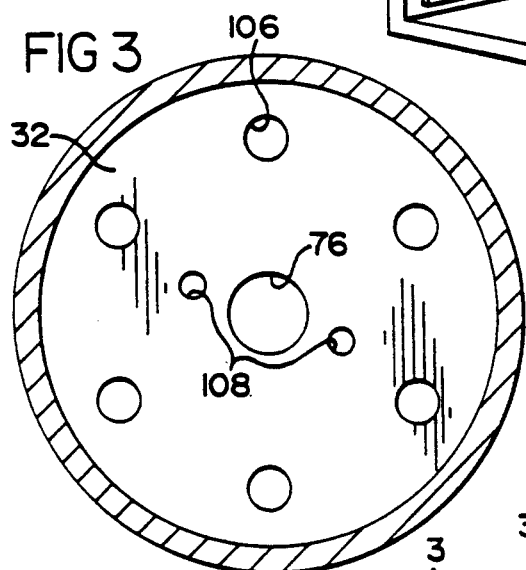
FIG. 3 is a vertical sectional view taken along the line 3—3 of FIG. 2 looking in the direction of the arrows with the light bulb socket removed.

The housing 30 has a plurality of air cooling holes 106 formed in the closed end 32 as shown in FIG. 3. The closed end also includes holes 108 to receive screws 110 for holding the mounting flange 112 of the socket 72 in place on the closed end 32.

In a preferred exbodiment, the housing 30 can be a single piece casting to define a strong base for the fixture 24. The flanged open end 34 can be machined on the retention surface 36 and on the circumferential surface 36a and outer surface 36b for a finished appearance. The inside surface 114 of the housing 30 can be machined smooth to provide a polished appearance or, alternatively, as illustrated, it can be threaded through a segment 116 thereof to provide light rings for a diffused appearance when looking up into the cavity of the housing 30.

The closed end 32, in the illustrated arrangement, has six ventilating holes 106, which are provided to keep the bulb temperature within desired operating levels. In the illustrated arrangement, holes are configured to provide suitable ventilation for a 20 watt halogen bulb 96.

The closed end 32 has a large central hole 76 machined therein for the bulb socket 72. The socket bracket 112 can be either screwed or riveted in place. The resultant structure provides a strong, movement resistant base into which bulbs can be changed without popping out the socket. The inside diameter of housing 30 is large enough to provide for easy replacement of the halogen lamp assembly 70 into and out of the closed end 32. Furthermore, the wires for the main light fixture 24 exit out the end wall 32 for connection to a suitable power supply.

The central hole 76 can be threaded if flexible conduit is desired to cooperate with the lock nut 78 to securely fasten the conduit fitting 80 in place to further provide a strong base which will not vibrate loose during elevator operation and which will enable bulbs to be connected and disconnected without affecting the wire connection to the socket 72.

Figure 5:
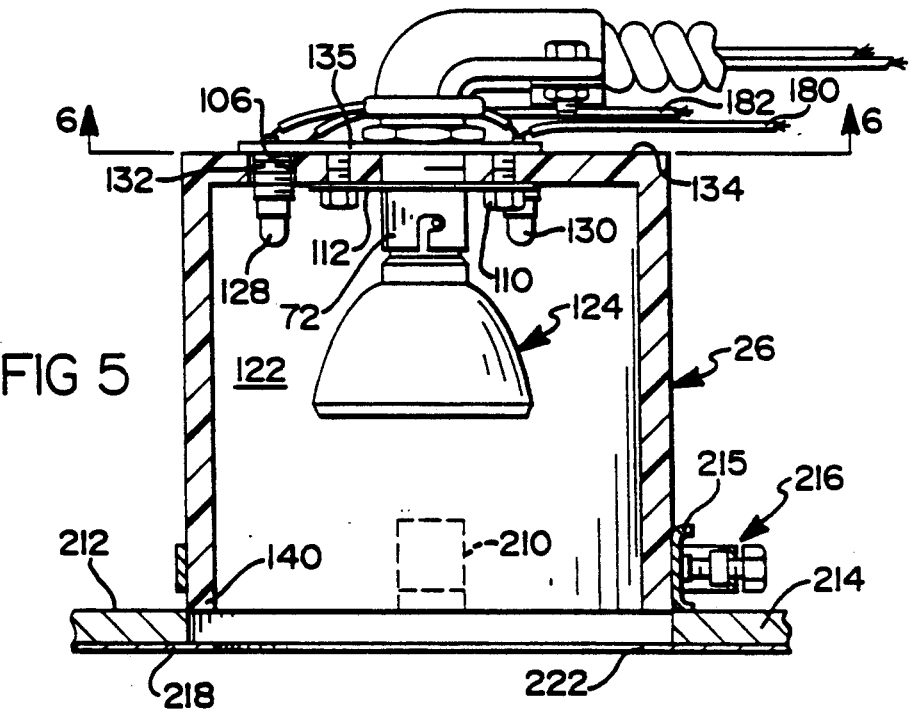
FIG. 5 is a diagrammatic view of an emergency lighting fixture in accordance with the present invention.

A further aspect of the present invention is illustrated in FIG. 5, which shows a combined fixture 26 for main and emergency lighting. The combined fixture 26 is essentially the same as the lamp fixture 24 in FIG. 2 but with the addition of an emergency bulb and socket assembly 120 formed in a side space 122 around a halogen lamp assembly 124.

A combined fixture 26 is mountable in ceiling 12 through access opening 28 therein in the same manner as discussed with reference to the lighting unit 24. In the illustrated arrangement, the only difference is the addition of two (or more) dedicated emergency light bulbs 126, 128, 130 which have sockets 132 fixed to a mounting plate 135. The mounting plate 135 is fixed to the outer surface 134 of the closed end of the fixture by means of two screws 110 that are used for holding the mounting flange 112 of the socket 72 for the halogen bulb. The emergency bulbs 126, 128, 130 are thus located in two of the vent holes 106 and allows the lens end 138 of bulbs 128, 130 to direct light energy downwardly through the open end 140 of the fixture 26. FIG. 6 shows the mounting plate 135 with three sockets 132 and an opening 142 for the socket 72.

FIG. 7 shows another embodiment of the invention in which the fixture housing remains the same but has a side conduit fitting 141. In this embodiment, the primary light source is a single ended fluorescent bulb 143 having its base 145 connected to a socket 147 in the closed end of a fixture housing corresponding to those previously discussed. The bulb 143 is shown as a dual unit (quad units could also be used) which has two ends 143a, 143b for directing down lighting through the open end of the fixture. An advantage of the embodiment is provided by a reduced lateral dimension which results in more space for an emergency bulb and socket assembly of the type shown at 120 in FIG. 5.

FIG. 7 illustrates an alternative mounting arrangement which locates a housing 190 On the inner surface 192 of a ceiling 194. The housing 190 is stabilized by two diametrically spaced L-brackets 196, 198 which are clamped to the housing 190 by a clamp 200 of the same configuration as clamp 50 in the FIG. 2 embodiment. Another feature of this mounting configuration is that it enables a trim bezel 202 to be inserted in the open end of housing 190 to provide a thin, finished exterior appearance. The trim bezel 202 has a small diameter tubular extension 204 held in place in the interior of the housing 190 by a plurality of spaced spring clips 206. This arrangement reduces the light aperture for aesthetic reasons and provides a flange 207 for covering the ceiling hole. It also enables the bezel to be removed for replacing the bulb.

FIG. 5 shows a third mounting arrangement. In this case, the open end 140 of the housing is clamped by diametrically spaced brackets 210 (one shown in dotted line) that are fastened bY suitable means to the inner surface 212 of the ceiling 214. The reaction plate 215 of a clamp 216 also engages the inner surface 212 and forms a third point for stabilizing the fixtures 26 on top of the ceiling 214. The ceiling 214 has a thin metal sheet 218 which has an edge that extends beyond a counterline 220 in the ceiling 214 to shield the open end 208. The sheet 218 has a hole 222 forming a light aperture for the fixture 26.

Figure 8:
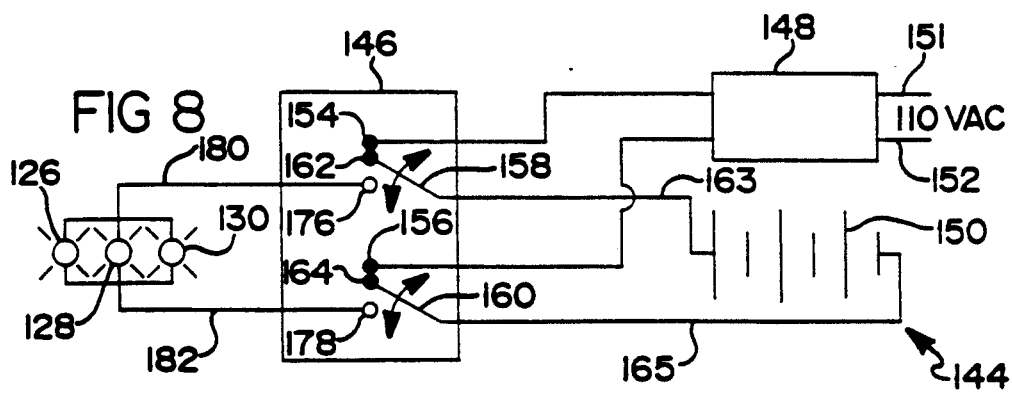
FIG. 8 is a diagrammatic view of an emergency lighting circuit and controller in accordance with my invention.

As shown in FIG. 8, the emergency light portion of fixture 26 is associated with an emergency lighting circuit 144. The emergency lighting circuit 144 includes a double pole, double throw relay 146 that selectively connects a battery charger 148 to either charge a gel cell (or cadmium nickel), rechargeable, direct current battery 150 or to connect the battery 150 to the emergency light bulbs 128, 130.

More particularly, the battery charger 148 has its input terminals connected to wires 150, 152 of a 110 volt power supply. The output terminals are connected to contacts 154, 156 which are electrically connected (by means of movable contact carriers 158, 160 when a coil 168 is energized) to contacts 162, 164 connected to conductors 163, 165, respectively for providing a charging circuit between the anode and cathode terminals of the battery 150. The charging circuit is controlled by relay coil 168 (FIG. 8A) that is connected across the 110 volt power supply to displace an armature 170 in a direction to close the contacts 154, 156. In cases where the 110 volt supply fails, the coil 168 is deenergized and the armature is returned by a spring 172 in a direction to open the contacts 158, 160 and to close normally open contacts 176, 178. The normally open contacts 176, 178, when closed, complete an emergency lighting circuit from the conductors 163, 165 through conductors 180, 182 to opposite sides of the emergency light bulbs 128, 130.

A feature of the present invention is that the armature 170 is directly connected to a test button 184 which can be pulled to overcome the force of the coil 168 and directly open the contacts 154, 156 to complete the battery lighting circuit across the lamps 126, 128, 130 during periods when the main power is on and when it is desired to test the emergency lighting.

Combined fixture 26 can be mounted on the ceiling 12 in a location with respect to an emergency test point represented by reference numeral 200 in FIG. 1. The test point is located one foot from the wall of the elevator with the control panel 16 and four feet from the floor 13. In order to meet test point candle power requirements, combined light fixture 26 is located on the ceiling closely adjacent and vertically above the test point 200. It has been found that the dedicated bulbs in fixture 26 provides sufficient illumination at the test point 200 to meet emergency candle power requirements in a space 22 when the main power has failed.

The provision of dedicated bulbs for emergency lighting in a common main lighting fixture housing enables the emergency lighting to be provided in the down lighting system without requiring extra fixture or lens costs. The dedicated bulbs are used on a standby basis and are not used for normal illumination and, therefore, are not subject to burn out. When the main power fails, all emergency lights are connected to the battery source and are concentrated in one spot directly over the test point. They are arranged to illuminate the test point in an unobstructed manner without requiring that the emergency light bend around baffles or other obstructions heretofore used to partially conceal emergency light bulb configurations.

Both the illuminating and emergency bulbs can be changed in the combination light fixture 26 without removing lenses or removing ceiling segments or use of a ladder.

If desired, a test switch could be placed in series with the relay coil and the test switch could be operated to simulate a power failure to see if the emergency lighting is standby ready. However, the installation of the pull rod on the armature accomplishes the same objective but is less expensive than a separate switch.

What is claimed is:

1. A lighting system for providing emergency lighting and regular illumination comprising:
   a housing including an open end and a closed end;
   means connected to said closed end of the housing that provides for connection of wires from a conduit to socket means located inboard of said housing;
   first socket means connected inboard of the housing for connecting a first primary source of illumination to the wires for directing regular illumination to a space below said ceiling;
   second socket means connected inboard of the housing at a point offset from a vertical axis through said first socket means for connecting a secondary source of illumination to an emergency power source for directing emergency lighting from the open end of said housing so as to provide an emergency source of illumination in the space below said ceiling because of main power failure in the source of electrical power connected to said wires; and circuit means for connecting the second socket means to a source of emergency power when the power supply for the first primary source of illumination fails;

said circuit means including a battery defining a rechargeable d.c. power source for emergency power, a battery charger having input terminals connected to the primary power source and outlet terminals for supplying charging current to said battery;

a double pole, double throw relay having a first pair of contacts and a second pair of contacts; a movable armature means operatively connected to said first and second pair of contacts, a coil energized by the primary power source to attract said armature to position said first pair of contacts to supply charging current to said battery when the primary power source is on;

spring means operative to position said armature means when primary power source fails to condition said first pair of contacts to interrupt the charging current circuit and to condition said second pair of contacts to direct current from said battery to said second socket means so as to energize lamp means therein to provide emergency lighting; and emergency test means manually operative for simulating power failure and to connect the secondary source of illumination to the battery for testing emergency lighting when the main power is on.

2. In the light system of claim 1, said means connected to said closed end of the housing including a low profile conduit fitting that provides for connection of wires from a flexible conduit to socket means located inboard of said housing.

3. In the light system of claim 1, said means connected to said closed end of the housing including a low profile conduit fitting that provides for connection of wires from a flexible conduit to socket means located inboard of said housing;

said emergency test means including an emergency test button connected to said armature and manually operative for overcoming the force of the coil on said armature means and to connect the secondary source of illumination to the battery for testing emergency lighting when the main power is on.

* * * * *